United States Patent [19]

Weller

[11] 4,022,365

[45] May 10, 1977

[54] PIN FEED PLATEN FOR DOCUMENT TRANSPORT MECHANISM

[75] Inventor: Ronald G. Weller, Fremont, Calif.

[73] Assignee: Qume Corporation, Hayward, Calif.

[22] Filed: May 13, 1976

[21] Appl. No.: 685,960

[52] U.S. Cl. .................................... 226/81; 226/87

[51] Int. Cl.$^2$ ........................................ G03B 1/24

[58] Field of Search .................. 226/54, 76, 81, 87, 226/49–51

[56] References Cited

UNITED STATES PATENTS

| | | | |
|---|---|---|---|
| 2,400,226 | 5/1946 | Euth | 226/81 X |
| 2,822,167 | 2/1958 | Metzner | 226/81 |

*Primary Examiner*—Richard A. Schacher

*Attorney, Agent, or Firm*—Townsend and Townsend

[57] ABSTRACT

An improved pin feed platen providing a positive pulling force on a print medium in a forward and reverse direction at the forward and reverse exit locations of a platen work station and affording easy initial loading of the medium to be transported.

A platen pin feed assembly includes housing means mounted for rotation with a platen and having a plurality of radially extending feed pin bores distributed about the axis of rotation, a plurality of feed pins each radially translatably received in a different one of the feed pin bores and each having an inner end, a tapered outer end and a camming slot located therebetween, and a camming member non-rotationally mounted with respect to the housing means.

The camming member has a compound camming surface extending about the axis of rotation of the platen and received within the camming slots of the feed pins control the radial position of the feed pin in a predetermined fashion so that each feed pin is partially extended at the rear of the platen to a position in which the outer ends thereof are visible to an operator. Because the ends of the feed pins are visible in this region, mating longitudinally arranged perforations in the medium can be easily fitted over the ends of the partially extended feed pins during loading.

14 Claims, 6 Drawing Figures

PIN FEED PLATEN FOR DOCUMENT TRANSPORT MECHANISM

BACKROUND OF THE INVENTION

This invention relates to document transport mechanisms having a rotatable platen used to transport sheet-like materials along a feed path past a workstation. More particularly, this invention relates to document feed mechanisms in which the platen is provided with one or more retractable pin feed assemblies for facilitating the transport of perforated documents.

Document feed mechanisms are known in which a flexible sheet of material, e.g. paper, is intermittently or continuously transported past a work station, such as the platen print area of a typewriter or a rotary printer. In a typical pin feed platen arrangement, the material to be transported is provided with longitudinally arranged edge perforations near the edges thereof, and the platen is provided with a feed assembly at either end thereof, with each feed pin assembly comprising a cylindrical end cap secured to an end of the platen and having a plurality of radially extending bores equiangularly spaced about the axis thereof, a stationary camming piece having a camming surface, and a plurality of feed pins each received in a different one of the radial bores in the end cap and each having a camming slot engaged with the camming surface. The camming surface conventionally has a single lobe near the top dead center position at the exit location of the work station for extending the end of each feed pin radially outwardly as the pin approaches the exit location so that a succession of feed pins smoothly engage successive perforations of the material. This arrangement provides a positive non-slip pulling force for transporting the material away from the work station, exact longitudinal registration of the material, and also prevents lateral movement of the paper. During initial loading of the material, the leading edge thereof is typically inserted from the bottom rear of the platen, the platen is manually rotated to frictionally transport the material through the work station area and the edge perforations at the leading edge are manually fitted onto the fully and partially extended feed pins near the exit location, after which the platen is manually or automatically rotated in the forward direction until the material is in the initial registration position for printing.

While this arrangement has been found to function in a satisfactory manner in those applications in which the material is transported in a single direction, it is entirely unsuited for use in those applications requiring bidirectional transport of the material. The reason for this unsuitability lies in the fact that the function of the feed pin arrangement is to pull the material away from the work station area, with the pulling force being exerted on the material at the exit location. In a bidirectional transport mechanism there are two exit locations: one in the forward direction and one in the reverse direction. Since the conventional feed pin assembly only extends the feed pins at one point along the 360° angular path of the platen, a positive pulling force can only be provided at one of the two exit stations.

Efforts have been made in the past to overcome this deficiency by redesigning the camming surface of each camming piece in the feed pin assembly so that the feed pins are extended at two locations along the 360° angular path of the platen: viz. a first location corresponding to the exit location in the forward direction and a second location corresponding to the exit location in the reverse direction. While this arrangement solves the problem of providing the requisite pulling force in both the forward and reverse directions, it greatly increases the difficulty of initially loading the material in a proper manner. In a typical platen transport mechanism, the exit location in the reverse direction is near the bottom of the platen, and the extended pins at that location are not visible to the user. Accordingly, when the user attempts to initially insert the material to be transported in the usual manner, the edge perforations near the leading edge of the material are exceedingly difficult to engage with the extended feed pins. Unless proper registration is initially obtained, the material is improperly fed through the work station, and must be retracted and refitted, which delays proper processing of the material and is accordingly undesirable. In exaggerated cases, where the material is fragile, tearing occurs in the region adjacent the edges perforations which destroys the utility of the material.

One solution proposed for this problem has been to redesign the platen mounting arrangement to render it entirely removable during the material loading process. This solution, however, is rather impractical since it lengthens the period of time required to initially set up the document transport mechanism, subjects the operator to environmental contaminants, such as grease, ribbon ink, and the like, and in many cases renders the appearance of the transport mechanism housing less esthetically desirable.

SUMMARY OF THE INVENTION

The invention comprises an improved pin feed platen which is economical to fabricate, rugged in construction, provides a positive pulling force on the material at both the forward and reverse exit locations of the platen work station, and which affords easy initial loading of the material to be transported.

In the preferred embodiment, a platen is mounted for rotation in a forward and reverse direction about an axis, and a feed pin assembly means is cooperatively arranged with respect to the platen in order to provide a pulling force for the material to be transported alternately at the forward and reverse material exit location when the platen is rotated in the forward and reverse directions, respectively. The feed pin assembly means comprises housing means mounted for rotation with the platen and having a plurality of radially extending feed pin bores distributed about the axis of rotation, a plurality of feed pins each radially translatably received in a different one of the feed pin bores and each having an inner end, a tapered outer end and a camming slot located therebetween, and a camming member nonrotionally mounted with respect to the housing means. The camming member has a camming surface extending about the axis of rotation of the platen and received within the camming slots of the feed pins, and includes first and second camming lobes located at first and second angular positions about the axis of platen rotation corresponding to the forward and reverse direction material exit locations, respectively, for translating the feed pins radially outwardly of the feed pin bores to a maximally extended position, an intermediate camming portion located at a third angular position corresponding to the work station for translating the feed pins radially inwardly of the feed pin bores to a fully retracted position, and a remaining camming portion located generally opposite the third angular position for translating the feed pins to a partially extended position in which the outer ends thereof are visible to an operator.

Preferably, a pair of feed pin assemblies are installed on a single platen, with each feed pin assembly located adjacent a different end of the platen. The individual housing means are secured to the platen ends, and the individual camming members are coupled to a stationary mounting member of the associated document transport mechanism. The camming surface is configured such that the first and second angular positions correspond to the top and bottom dead center positions, respectively, of the platen rotational path, the intermediate camming portion is located to the front of the platen and the remaining camming portion is located rearwardly of the platen.

In use, installation of the material to be transported is greatly facilitated by the partial extension of the feed pins afforded by the remaining camming portion of the camming member surface to a radial position in which the outer ends of the pins in the vicinity of the reverse direction exit location are visible to the operator. Because the ends of the feed pins are visible in this region, the perforations in the material can be easily fitted over the ends of the partially extended feed pins and the ends of the fully extended feed pins at the reverse direction material exit location.

For a fuller understanding of the nature and advantages of the invention, reference should be had to the ensuing detailed description taken in conjunction with the accompanying drawings.

DESCRIPTION OF THE PREFERRED EMBODIMENT

Figure 1:
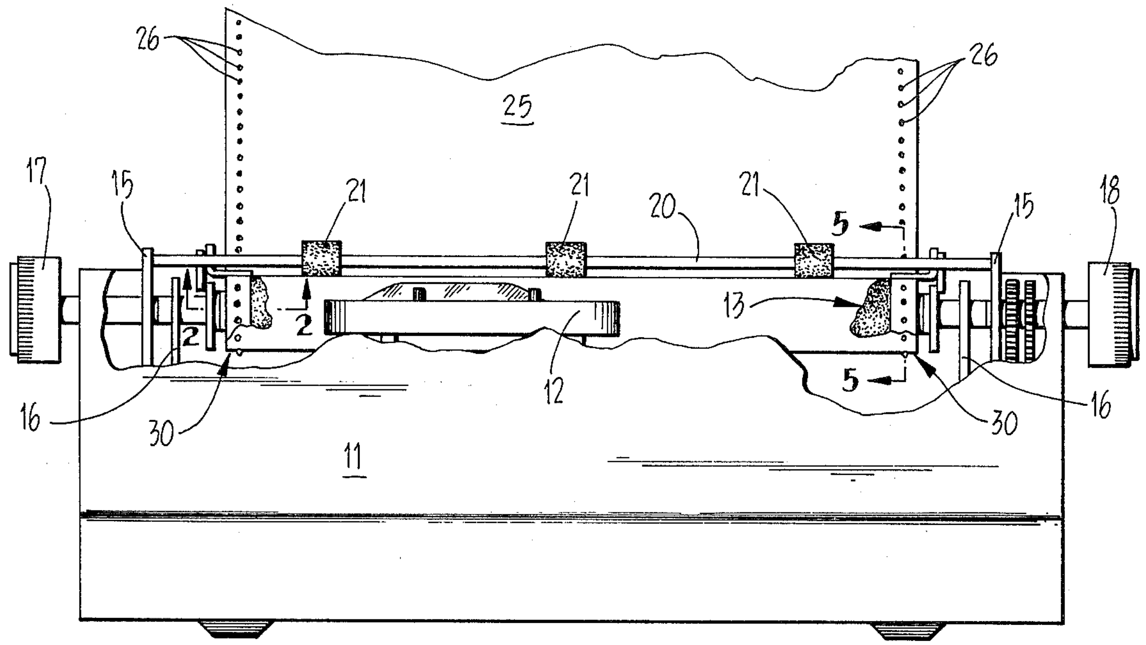
FIG. 1 is a front elevational view partially broken away of a printer incorporating the preferred embodiment of the invention.

Turning now to the drawings, FIG. 1 illustrates a preferred embodiment of the invention incorporated into a printer generally designated by reference numeral 10. Printer 10 includes a housing 11 for a printing mechanism of the flying wheel tape type, such as a Model Q45 printer commercially available from QUME Corporation of Hayward, Calif., which includes an inked ribbon cartridge 12, the cartridge 12 being mounted on a traveling carriage for lateral movement along a platen 13.

Platen 13 is rotatably mounted on upstanding support members 15, 16 arranged outboard thereof, and is provided with a pair of adjustment knobs 17, 18 at opposite ends thereof to enable manual feeding of a print medium along a feed path past a printing station forwardly of platen 13 and to the rear of cartridge 12. Platen 13 is further provided with a suitable incremental driving arrangement, such as that disclosed in U.S. Pat. No. 3,880,016 issued Apr. 29, 1975, for automatically transporting the print medium past the printing station. It is noted that platen 13 may be rotated in either one of two opposite directions either manually by rotation of adjustment knobs 17 or automatically by operation of the associated driving mechanism. In the ensuing disclosure, the forward direction is defined as clockwise rotation of platen 13 as viewed from the right of the apparatus shown in FIG. 1, while the reverse direction is defined as counterclockwise rotation of the platen 13 viewed in the same direction.

Mounted in operative relation to platen 13 is a conventional bail 20 having a plurality of friction rollers 21 mounted thereon. As will be appreciated by those skilled in the art, bail 20 is mounted in such a manner that it may be lifted from the position illustrated in FIG. 1 to an alternate position in which the friction rollers 21 are raised away from surface contact with platen 13. Since such mounting mechanisms are generally well known, further details thereof are omitted to avoid prolixity.

Mounted above platen 13 and to the rear of the housing 11 is a conventional tractor feed mechanism 23 for facilitating document transport. Such mechanisms are likewise well known and are accordingly not further discussed herein.

In the preferred embodiment of FIG. 1, the print medium to be transported is a flexible sheet of paper or other suitable print medium provided with spaced perforations 26 located at opposite edges thereof and extending longitudinally of the material 25. In order to provide proper transport of print medium 25 in the region of the work station in either the forward or the reverse direction, platen 13 is provided with a pair of substantially identical feed pin assemblies 30 arranged at either end thereof.

Figure 2:
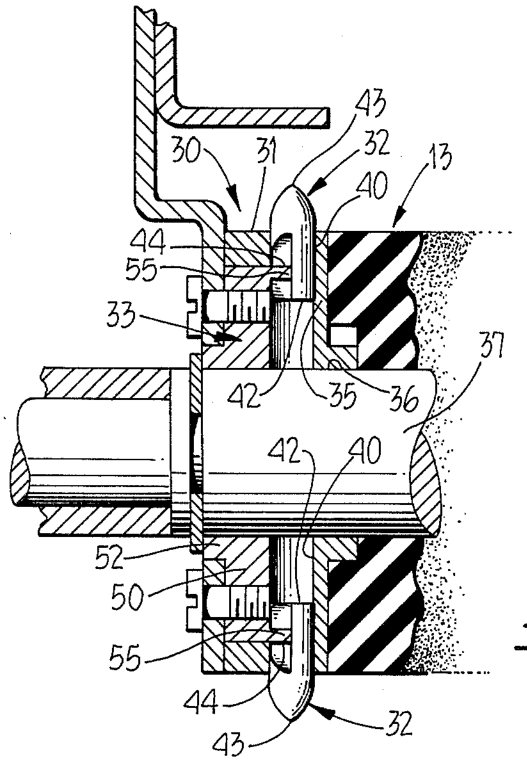
FIG. 2 is a sectional view taken along lines 2—2 looking in the rearward direction of the printer of FIG. 1.

With reference to FIGS. 2 an 3, each feed pin assembly 30 comprises an end cap 31 secured to the respective end of platen 13 for rotation therewith, a plurality of feed pins 32, and a camming piece 33 secured in a stationary manner with respect to member 31. Member 31 comprises a generally cylindrical member having an open end facing away from the end of platen 13 to which the member is attached, a hollow interior, and an inner end wall 35 with a central aperture 36 dimensioned to receive the platen shaft 37. A plurality of radially extending bores 40 are formed in end cap member 31, which are equiangularly distributed about the axis thereof. In the preferred embodiment, nine such feed pin bores are provided at angular locations separated by an angle of 40°.

Received within each one of feed pin bores 40 is an individual feed pin 32 having a substantially flat inner end 42, a tapered outer end 43, and a camming slot 44 engaged with a camming surface, described below, for controlling the radial position of the pin in the corresponding bore 40.

Figure 3:
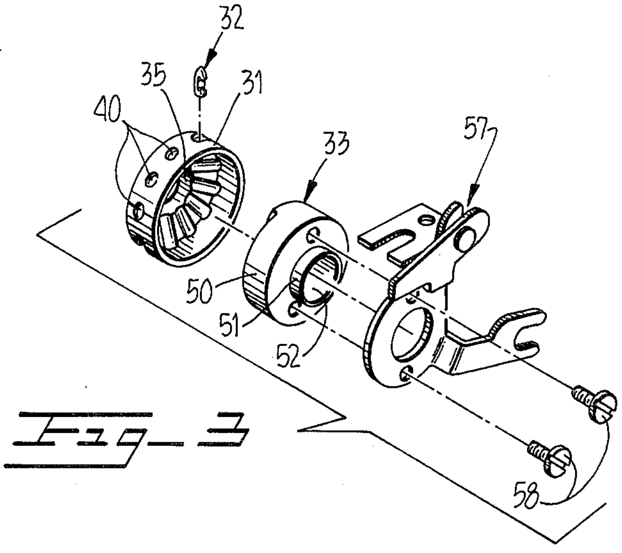
FIG. 3 is an exploded perspective view of the right feed pin assembly.
Figure 4:
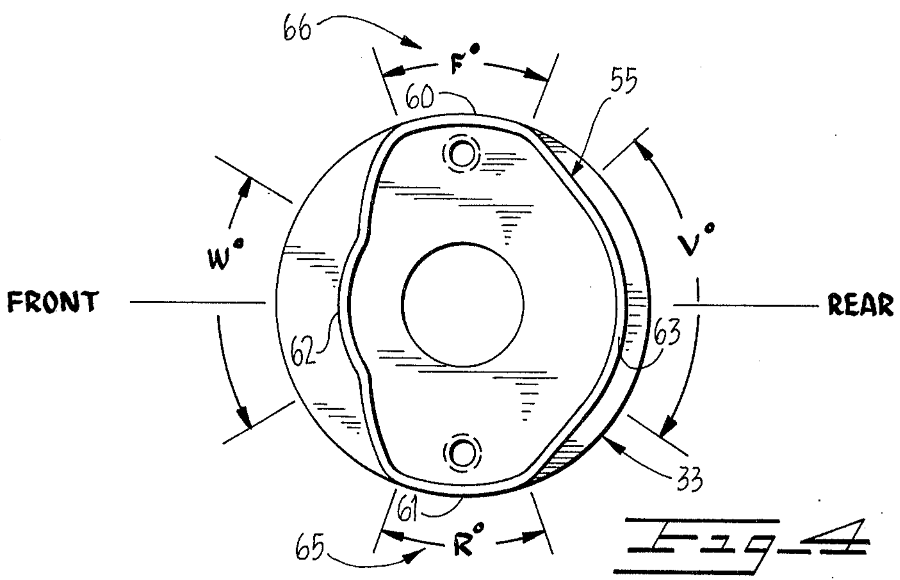
FIG. 4 is an end elevational view of the camming member of the left feed pin assembly illustrating the contour of the camming surface.

With reference to FIGS. 3 and 4, camming piece 33 includes a generally cylindrical body members 50 having an axially extending boss 51 with a central aperture 52 dimensioned to rotatably receive platen shaft 37, the outer diameter of cylindrical body portion 50 being smaller than the inner diameter of end cap member 31 in order to be rotatably received therein. Integrally formed on the end of camming piece 33, and facing the associated end cap member 31 is an axially extending camming surface generally designated by reference numeral 55 and having a wall thickness and an axial length of sufficient dimension to be snugly received within the camming slot 44 of feed pins 32. To secure camming piece 33 against rotation relative to end cap member 31, camming piece 33 is secured to a conventional paper guide 57 by means of cap screws 58, paper feed guide 57 being removably secured to conventional mounting elements of printer 10 to provide a relatively stationary mounting reference for camming piece 33.

Figure 5:
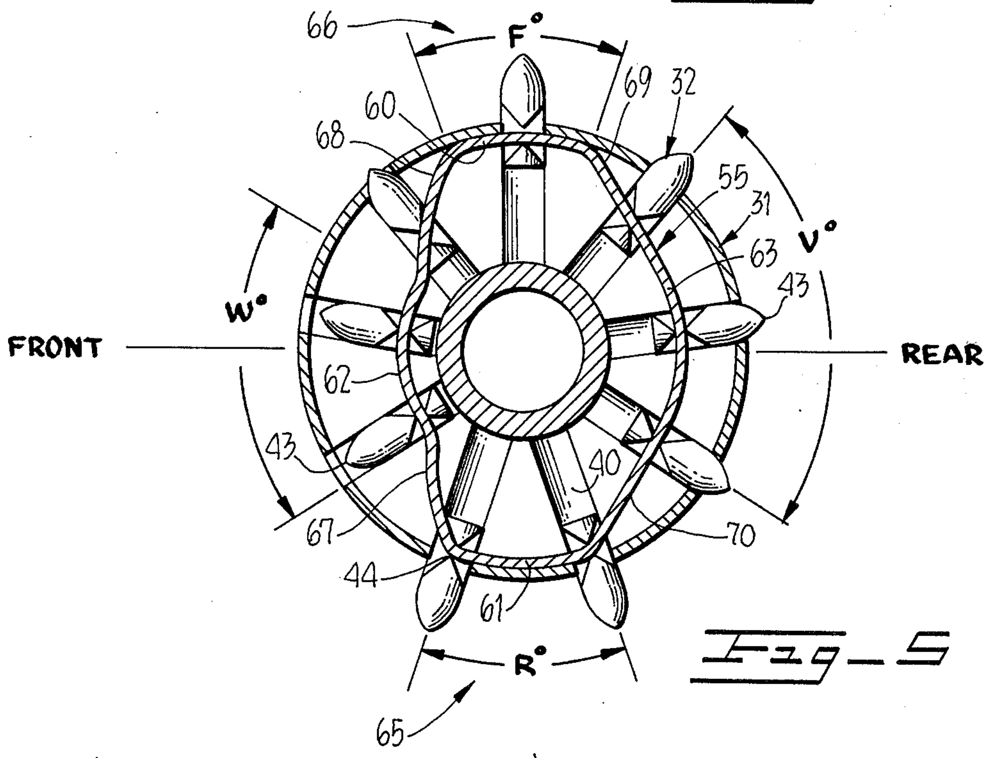
FIG. 5 is a sectional view taken along lines 5—5 of FIG. 1 illustrating the cooperative relationships between the various elements of the feed pin assembly.

The functional cooperation between the several elements comprising the pin feed assembly 30 may best be understood with reference to FIG. 5. As shown in this figure, lobes 60, 61 of camming surface 55 provide maximum exension of feed pins 32 in the radially outward direction, intermediate camming portion 62 provides maximum retraction of feed pins 32 in the radially inward direction, and camming portion 63 provides a partial extension of feed pins 32 externally of the outer surface of end cap member 31. When platen 13 is rotating in the forward direction, i.e. clockwise as viewed in FIG. 5, and end cap member 31 rotates therewith, the motion of each feed pin 32 in its respective bore 40 is as follows. Beginning at bottom dead center position 65, corresponding to the reverse direction exit location, the feed pin 32 is positioned at the extreme outermost radial location in the bore 40. As the camming slot 44 rides along portion 57 of camming surface 55 the pin 32 is retracted radially until the lead-in end of camming portion 62 is reached, at which time the pin 32 is maximally retracted to a position in which the end 43 thereof no longer extends externally of end cap member 31. Along camming portion 62, pin 32 is maintained in this retracted radial position. As camming slot 44 rides along portion 68 of camming surface 55, the pin is gradually extended radially outwardly until the lead-in end of camming lobe 60 is reached, where the pin 32 is maximally extended to a position at which the end 43 thereof extends a maximum radial distance externally of the outer surface of end cap member 31. As the camming slot 44 travels along camming lobe 60, the pin 32 is maintained in this maximally extended position. Along camming portion 69, the pin 32 is gradually retracted until the lead-in end of camming portion 55 is encountered, at which point the pin 32 is positioned in a partially extended manner. Along camming portion 55, pin 32 is maintained in this partially extended position in which the end 43 extends outwardly beyond the outer surface of end cap portion 31. Along camming portion 70, the pin 32 is gradually extended to the maximum position at the lead-in end of lobe 61. Counterclockwise rotation of platen 13, and the corresponding rotation of end cap member 31, results in translation of pins 32 in a manner reverse to that described above.

Figure 6:
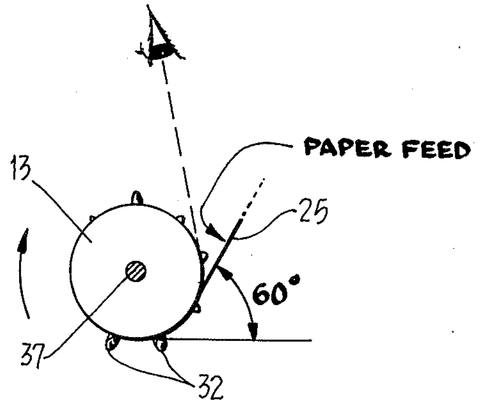
FIG. 6 is a schematic side view of the preferred embodiment of the invention illustrating use of the invention.

Lobe 60 of camming surface 55 corresponds to the exit location in the forward direction, while lobe 61 corresponds to the exit location in the reverse direction. Camming portion 62 corresponds to the print station, while camming portion 63 of camming surface 55 corresponds to the operator viewing area during loading of the print medium. As best shown in FIG. 6, when the operator is required to load the leading edge of the perforated print medium sheet 25, which is normally fed from the rear of the printer to the front, the leading edge approaches the bottom of platen 13 from the rear of the apparatus. Since feed pins 32 are partially extended by portion 63 of camming surface 55 to a position in which the ends 43 are viewable to the operator as normally stationed, the edge perforations may be readily fitted onto pins 32.

Thereafter, the print medium 25 may be fed either manually or automatically into the region of the work station and printing may commence.

The angles subtended by lobes 60, 61 and portions 62, 63 of camming surface 55 and the relative locations thereof on the circle defining the rotational path of platen 13 are chosen in accordance with the requirements of a given application. In the preferred embodiment, camming lobes 60, 61 are oppositely disposed symmetrically about the center line between the front and the rear of the apparatus and each lobe 60, 61 subtends at angle $F°$, $R°$, respectively substantially equal to the angle subtended by the center lines of adjacent radial bores 40. Since there are nine bores 40 which are equiangularly disposed about the axis of rotation, lobes 60, 61 each subtends an angle of 40°. The work station angle $W°$ subtended by camming portion 62 is 60° and is symmetrically disposed about the front-rear center line, while the viewing angle $V°$ subtended by camming portion 63 is 76° and is symmetrically disposed about the front-rear centerline.

Document transport mechanisms fabricated in accordance with the teachings of the invention have been found to greatly facilitate initial loading of the print medium, while affording proper positive feed action to the print medium in both the forward and the reverse directions. It is noted that the end cap members 31, feed pins 32 and camming pieces 33 are universally interchangeable, so that one set of standard elements functions equally well on both the right and left hand sides of platen 13.

While the above prcvides a complete disclosure of the preferred embodiment of the invention, various modifications, alternate constructions and equivalents may be employed without departing from the true spirit and scope of the invention. For example, while the feed pin assemblies 30 have been illustrated and described as being mounted at opposite ends of platen 13, these locations are dictated by the position of perforations 26 in print medium 25. Thus, if perforations 26 are located inwardly of the edges of medium 25, feed pin assemblies may be correspondingly repositioned in order to provide mating engagement therewith. In addition, in print media having a single roll of perforations 26, e.g. a row extending longitudinally at the center of medium 25, only one feed pin assembly 30 need be provided at the corresponding location on platen 13. Accordingly, the above description and illustrations should not be construed as limiting the scope of the invention which is defined by the appended claims.

What is claimed is:

1. A document transport mechanism for transporting flexible material having longitudinally spaced perforations past a work station having a forward direction material exit location and a reverse direction material exit location, said document transport mechanism comprising:

stationary mounting means;

a platen mounted to said stationary mounting means for rotation in said forward and said reverse directions about an axis; and feed pin assembly means for providing a pulling force for said material alternately at said forward and said reverse material exit locations when said platen is rotated in said forward and said reverse directions, respectively, said feed pin assembly means including housing means mounted to said platen for rotation therewith and having a plurality of radially extending feed pin bores distributed about said axis of rotation, a plurality of feed pins each translatably received in a different one of said feed pin bores and each having an inner end, a tapered outer end, and a camming slot located therebetween; and a camming member non-rotationally mounted with respect to said housing means, said camming member having a substantially rigid camming surface arranged about said axis of rotation and recieved within said camming slots of said feed pins, said camming surface having first and second camming lobes located at first and second angular positions about said axis corresponding to said forward and said reverse direction material exit locations, respectively, for translating said feed pins radially outwardly of said feed pin bores to a maximal extended position, an intermediate camming portion located at a third position corresponding to said work station for translating said feed pins radially inwardly of said feed pin bores to a fully retracted position, and a remaining camming portion located generally opposite said third angular position for translating said feed pins to a partially extended position in which said outer ends are visible to an operator.

2. The combination of claim 1 wherein said housing has a generally cylindrical configuration.

3. The combination of claim 1 wherein said housing is secured to said platen.

4. The combination of claim 1 wherein said housing is secured to an end of said platen.

5. The combination of claim 1 wherein said camming member is coupled to said stationary mounting means.

6. The combination of claim 1 wherein said remaining camming portion of said camming surface is arranged along the rear of said platen.

7. The combination of claim 1 wherein said feed pin bores are equiangularly distributed in said housing about said axis of rotation.

8. The combination of claim 1 wherein said feed pin assembly means comprises first and second housing means each mounted for rotation with said platen at different locations therealong and each having a plurality of radially extending feed pin bores distributed about said axis of rotation; first and second pluralities of feed pins received respectively in a different one of said feed pin bores of said first and second housing means, each said feed pin having an inner end, a tapered outer end, and a camming slot located therebetween; and first and second camming members each nonrotatably mounted with respect to a different one of said first and second housing means, each said camming member having a substantially rigid camming surface arranged about said axis of rotation and received within said camming slots of said feed pins in the associated one of said first and second housing means, each said camming surface having first and second camming lobes located at first and second angular positions about said axis corresponding to said forward and said reverse direction material exit locations, respectively, for translating said feed pins radially outwardly of said feed pin bore to a maximal extended position, an intermediate camming portion located at a third angular position corresponding to said work station for translating said feed pins radially inwardly of said feed pin bores to a fully retracted position; and a remaining camming portion located generally opposite said angular position for translating said feed pins to a partially extended position in which said outer ends are visible to an operator.

9. The combination of claim 8 wherein each of said pluralities of feed pin bores are equiangularly distributed about said axis of rotation.

10. The combination of claim 8 wherein each of said first and second housing means is coupled to said platen.

11. The combination of claim 8 wherein each of said first and second housing means is coupled to a different end of said platen.

12. The combination of claim 8 wherein each of said first and second camming members is coupled to said stationary mounting means.

13. A feed pin assembly for use in a document transport mechanism having a platen mounted for rotation about an axis for transporting flexible material having longitudinally spaced perforations past a work station having an adjacent forward direction material exit location and an adjacent reverse direction material exit location, said feed pin assembly providing a pulling force for said material alternately at said forward and said reverse material exit locations when said platen is rotated in said forward and reverse directions respectively, said feed pin assembly comprising:

housing means adapted to be mounted to said platen for rotation therewith about an axis of rotation and having a plurality of radially extending feed pin bores therein distributed about said axis of rotation;

a plurality of feed pins each translatably received in a different one of said feed pin bores and each having an inner end, a tapered outer end, and a camming slot located therebetween; and a camming member adapted to be non-rotatably mounted with respect to said housing means, said camming member having a substantially rigid camming surface arranged about said axis of rotation and received within said camming slots of said feed pins, said camming surface having a first and second camming lobes located at first and second angular positions about said axis corresponding to said forward and said reverse direction material exit locations, respectively, for translating said feed pins radially outwardly of said feed pin bores to a maximum extended position, an intermediate camming portion located at a third angular position corresponding to said work station for translating said feed pins radially of said feed pin bores to a fully retracted position; and a remaining camming portion located generally opposite said third angular position for translating said feed pins to a partially extended position in which said outer ends are visible to an operator when said feed pin assembly is installed in situ.

14. The combination of claim 13 wherein said feed pin bores are equiangularly distributed about said axis of rotation.

* * * * *